US011920562B2

(12) United States Patent
Berra et al.

(10) Patent No.: US 11,920,562 B2
(45) Date of Patent: Mar. 5, 2024

(54) TEMPERATURE ESTIMATION IN A WIND TURBINE

(71) Applicant: VESTAS WIND SYSTEMS A/S, Aarhus N. (DK)

(72) Inventors: Asier Berra, Billund (DK); Steven John Hayden, Aarhus N (DK)

(73) Assignee: VESTAS WIND SYSTEMS A/S, Aarhus N. (DK)

( * ) Notice: Subject to any disclaimer, the term of this patent is extended or adjusted under 35 U.S.C. 154(b) by 0 days.

(21) Appl. No.: 18/008,363

(22) PCT Filed: Jun. 2, 2021

(86) PCT No.: PCT/DK2021/050171
§ 371 (c)(1),
(2) Date: Dec. 5, 2022

(87) PCT Pub. No.: WO2021/244722
PCT Pub. Date: Dec. 9, 2021

(65) Prior Publication Data
US 2023/0279843 A1    Sep. 7, 2023

(30) Foreign Application Priority Data

Jun. 4, 2020    (DK) .......................... PA 2020 70354

(51) Int. Cl.
*F03D 17/00*    (2016.01)
(52) U.S. Cl.
CPC .......... *F03D 17/00* (2016.05); *F05B 2260/84* (2013.01)

(58) Field of Classification Search
CPC . F03D 17/00; F03D 9/25; F03D 15/00; F05B 2260/84; F05B 2260/80;
(Continued)

(56) References Cited

U.S. PATENT DOCUMENTS

2017/0227421 A1    8/2017  Kuhara
2020/0109700 A1*   4/2020  Shen ........................ G01K 7/16

FOREIGN PATENT DOCUMENTS

CN    103758696 A    4/2014
CN    104131950 A    11/2014
(Continued)

OTHER PUBLICATIONS

International Search Report and Written Opinion for PCT Application No. PCT/DK2021/05171, dated Jul. 30, 2021.
(Continued)

*Primary Examiner* — Brandon D Lee
(74) *Attorney, Agent, or Firm* — Patterson + Sheridan, LLP

(57) ABSTRACT

A method of estimating a temperature of a component of a wind turbine is provided, comprising, during a calibration period, receiving measurements of the temperature of the component and of one or more corresponding operational parameter; and calculating, using the measurements coefficients of a model of the temperature of the component. The model relates temperature at a current time to a temperature a preceding time, $T_{n-1}$. The model is segregated into separate bins based on wind speed or power generated by the wind turbine. The method further comprises using the model to estimate a temperature of the wind turbine.

17 Claims, 2 Drawing Sheets

(58) Field of Classification Search
CPC .......... F05B 2260/821; F05B 2270/303; F05B 2270/327; F05B 2270/32; F05B 2270/335; Y02E 10/72
See application file for complete search history.

(56) References Cited

FOREIGN PATENT DOCUMENTS

| | | |
|---|---|---|
| CN | 110414155 A | 11/2019 |
| CN | 110703025 A | 1/2020 |
| WO | 2009003478 A2 | 1/2009 |
| WO | 2016206692 A1 | 12/2016 |
| WO | 2018209655 A1 | 11/2018 |
| WO | 2019042773 A1 | 3/2019 |

OTHER PUBLICATIONS

Danish Patent Office, Search Opinion for Danish Patent Application No. PA 202070354, dated Nov. 9, 2020.
Danish Patent Office, Search Report—Patent for Danish Patent Application No. PA 202070354, dated Nov. 9, 2020.

* cited by examiner

TEMPERATURE ESTIMATION IN A WIND TURBINE

FIELD OF THE INVENTION

The present invention relates to wind turbines, and in particular to estimation of temperatures of components in wind turbines.

BACKGROUND OF THE INVENTION

It is important to know the temperature of various components of a wind turbine, to ensure they are behaving as expected and prevent damage to any part of the turbine. Usually, multiple temperature sensors are used to track temperature of a given component. Using multiple sensors allows measurements to be compared and verified, and provides redundancy against failure.

However, one or more of these temperature sensors can fail during the lifetime of the turbine, and can be difficult to replace. Without knowledge of the operational temperature of key components, the turbine may have to be taken offline, There is therefore a need for alternative measurements of the temperature of the components.

SUMMARY OF THE INVENTION

A first aspect of the invention provides a method of estimating a temperature of a component of a wind turbine, the method comprising:
  during a calibration period:
    receiving measurements of the temperature of the component measured by a temperature sensor of the wind turbine;
    receiving measurements of one or more operational parameters of the wind turbine corresponding to the measurements of the temperature, the one or more operational parameters comprising at least measurements of wind speed or power generated by the wind turbine;
  calculating, using the measurements of temperature and of the one or more operational parameters, coefficients of a model of the temperature of the component, wherein:
    the model relates a temperature of the component at a current time, $T_n$, to a value of the one or more operational parameters at the current time and to a temperature of the component at a preceding time, $T_{n-1}$;
    the model is segregated into separate bins based on wind speed or power generated by the wind turbine, such that the model comprises, for each bin, respective coefficients relating the temperature of the wind turbine at the current time, $T_n$, to the value of the one or more operational parameters at the current time and to the temperature of the component at a preceding time, $T_{n-1}$; and
    calculating coefficients of the model comprises assigning each measurement of the temperature and the one or more operational parameters to one or more bins of the model, and fitting the coefficients of each bin to the measurements assigned to that bin; and
  using the model to estimate a temperature of the component of the wind turbine.
In some embodiments, using the model to estimate a temperature of the component of the wind turbine further comprises:
  during an operational period:
    receiving a measurement of the one or more operational parameters taken at a first time;
    assigning the measurement of the one or more operational parameters to a bin of the model based on the wind speed or power generated at the first time; and
    inputting the measurement of the one or more operational parameters into the model to estimate the temperature of the component at the first time, $T_x$, using the coefficient of the bin to which the measurement is assigned and an estimate of the temperature at a time preceding the first time, $T_{x-1}$.

The method may further comprise operating the wind turbine in accordance with the estimation of the temperature of the component at the first time.

In some embodiments, the method may further comprise estimating an uncertainty in the temperature of the component at the first time, wherein the uncertainty is based on a statistical uncertainty of the estimate of the temperature at the first time, and on an uncertainty at the time preceding the first time.

In some embodiments, the method may further comprise, during the operational period:
  receiving a measurement of the temperature of the component measured by a temperature sensor of the wind turbine at the first time; and
  comparing the measurement to the estimate of the temperature at the first time to validate the measurement.

In some such embodiments, the method may further comprise:
  determining that a difference between the measurement of temperature and the estimate of the temperature exceeds a predetermined threshold; and
  determining that the measurement from the temperature sensor is invalid.

In some embodiments, using the model to estimate a temperature of the component of the wind turbine may comprise or further comprise calculating a steady state temperature of the component from the model. Such embodiments may comprise comparing the steady state temperature of the component of the wind turbine to corresponding steady state temperatures from one or more other wind turbines. Some embodiments may further comprise identifying an anomaly in the wind turbine based on the comparison. Alternatively or additionally, the method may comprise comparing the steady state temperature to an expected steady state temperature of the wind turbine.

In some embodiments, the component may be at least one of: a generator; a generator winding; a transformer; a transformer winding; a gearbox; gearbox oil; hydraulic oil; a converter; one or more bearings; and a cooling-water system.

In some embodiments, the component may be a generator or generator winding, the one or more operational parameters may further comprise at least one of generator rotor speed; generator voltage; and reactive power.

In some embodiments, the model may relate a temperature of the generator or generator winding at a current time to;
  a square of a current power generated by the turbine;
  a current generator rotor speed; and
  a temperature of the generator or generator winding at a preceding time.

A second aspect of the invention provides a computer program comprising instructions which, when the program is executed by a computer, causes the computer to perform the method of any of embodiment of the first aspect.

A third aspect of the invention provides a controller for a wind turbine comprising a processor and a memory; wherein the controller is configured to receive measurements of operational parameters from one or more sensors of the wind turbine; and wherein the memory stores instructions which, when executed by the processor, cause the processor to perform the method of any embodiment of the first aspect.

A fourth aspect of the invention provides a wind turbine comprising one or more sensors for measuring operational parameters during operation of the wind turbine; and a controller according any embodiment of the third aspect of the invention.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
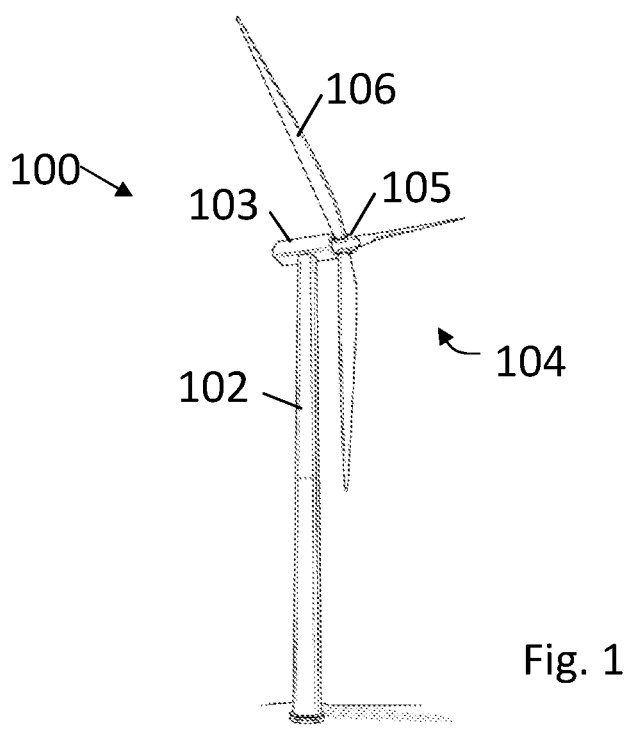
FIG. 1 is a schematic representation of a wind turbine.

FIG. 1 illustrates, in a schematic perspective view, an example of a wind turbine 100. The wind turbine 100 includes a tower 102, a nacelle 103 at the apex of the tower, and a rotor 104 operatively coupled to a generator housed inside the nacelle 103. In addition to the generator, the nacelle houses miscellaneous components required for converting wind energy into electrical energy and various components needed to operate, control, and optimize the performance of the wind turbine 100. The rotor 104 of the wind turbine includes a central hub 105 and a plurality of blades 106 that project outwardly from the central hub 105. In the illustrated embodiment, the rotor 104 includes three blades 106, but the number may vary. Moreover, the wind turbine comprises a control system. The control system may be placed inside the nacelle or distributed at a number of locations inside the turbine and communicatively connected.

The wind turbine 100 may be included among a collection of other wind turbines belonging to a wind power plant, also referred to as a wind farm or wind park, that serve as a power generating plant connected by transmission lines with a power grid. The power grid generally consists of a network of power stations, transmission circuits, and substations coupled by a network of transmission lines that transmit the power to loads in the form of end users and other customers of electrical utilities.

Figure 2:
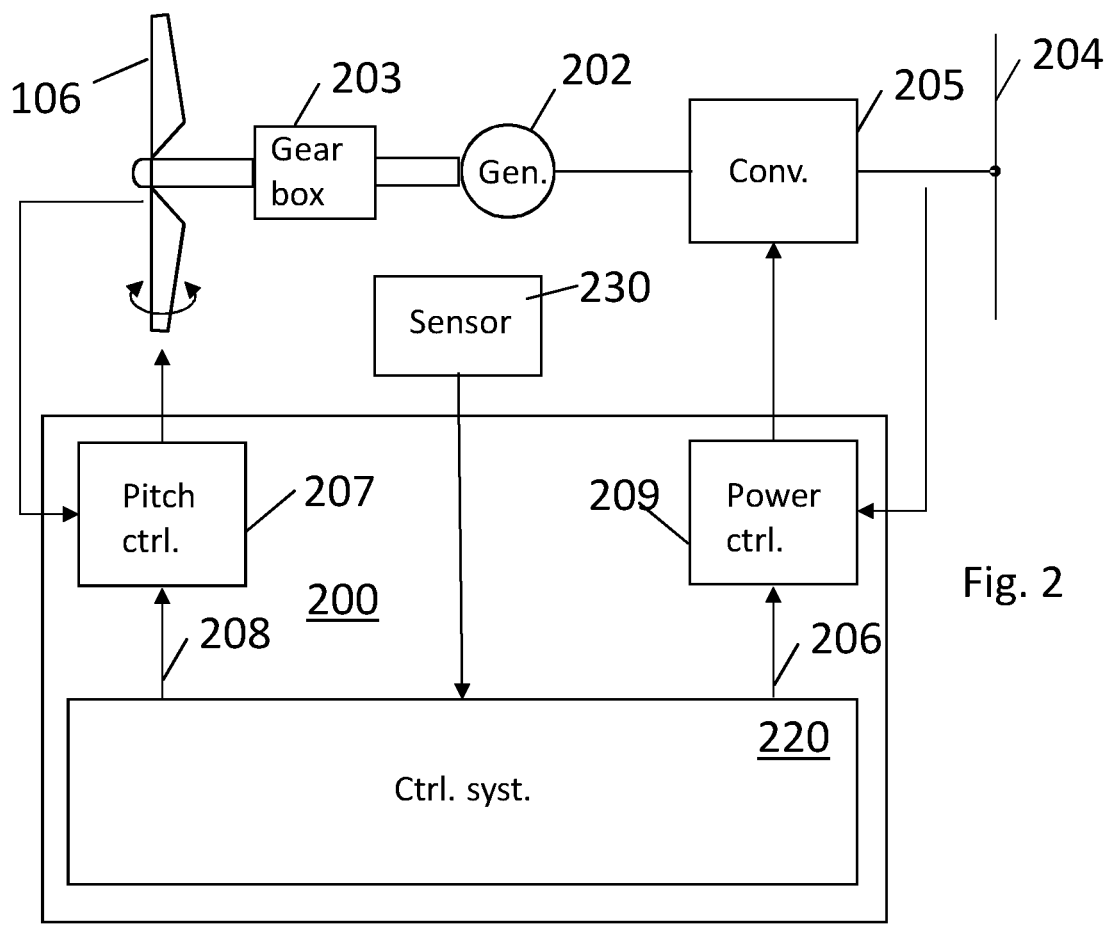
FIG. 2 is a schematic representation of a control system of a wind turbine.

FIG. 2 schematically illustrates an embodiment of a control system 200 together with elements of a wind turbine. The wind turbine comprises rotor blades 106 which are mechanically connected to an electrical generator 202 via gearbox 203. In direct drive systems, and other systems, the gearbox 203 may not be present. The electrical power generated by the generator 202 is injected into a power grid 204 via an electrical converter 205. The electrical generator 202 and the converter 205 may be based on a full scale converter (FSC) architecture or a doubly fed induction generator (DFIG) architecture, but other types may be used.

The control system 200 comprises a number of elements, including at least one main controller 220 with a processor and a memory, so that the processor is capable of executing computing tasks (such as the methods discussed below) based on instructions stored in the memory. In general, the wind turbine controller ensures that in operation the wind turbine generates a requested power output level. This is obtained by adjusting the pitch angle of the blades 106 and/or the power extraction of the converter 205. To this end, the control system comprises a pitch system including a pitch controller 207 using a pitch reference 208, and a power system including a power controller 209 using a power reference 206. The wind turbine rotor comprises rotor blades that can be pitched by a pitch mechanism. The rotor comprises an individual pitch system which is capable of individual pitching of the rotor blades, and may comprise a common pitch system which adjusts all pitch angles on all rotor blades at the same time. The control system, or elements of the control system, may be placed in a power plant controller (not shown) so that the turbine may be operated based on externally provided instructions.

The control system 200 further comprises a number of temperature sensors 230 (for clarity only one sensor is represented in FIG. 2). These sensors 230 are positioned at various locations in the wind turbine 100 to measure the temperature of particular components of the turbine, such as the generator windings. The temperature sensors 230 provide temperature measurements to the controller 220, which monitors the temperature of the various controllers to ensure correct turbine operation, and may adjust operation of the turbine based on the temperature readings. For example, if a component is getting too hot, the controller 220 may control operation of the turbine 100 to reduce the temperature of that component (e.g. reducing a physical or electrical load on a component), to prevent permanent damage to the wind turbine 100.

Ideally, the temperature sensors 230 will function correctly for the full lifetime of the turbine 100. In practice, however, sensors 230 are likely to fail. Repairing or replacing a failed temperature sensor 230 may be difficult and costly, for example requiring shutdown of the turbine 100. However continued operation of the wind turbine 100 requires knowledge of component temperature, leaving operators with little choice but to repair the sensor 230 or risk permanent damage to the turbine 100.

Figure 3:
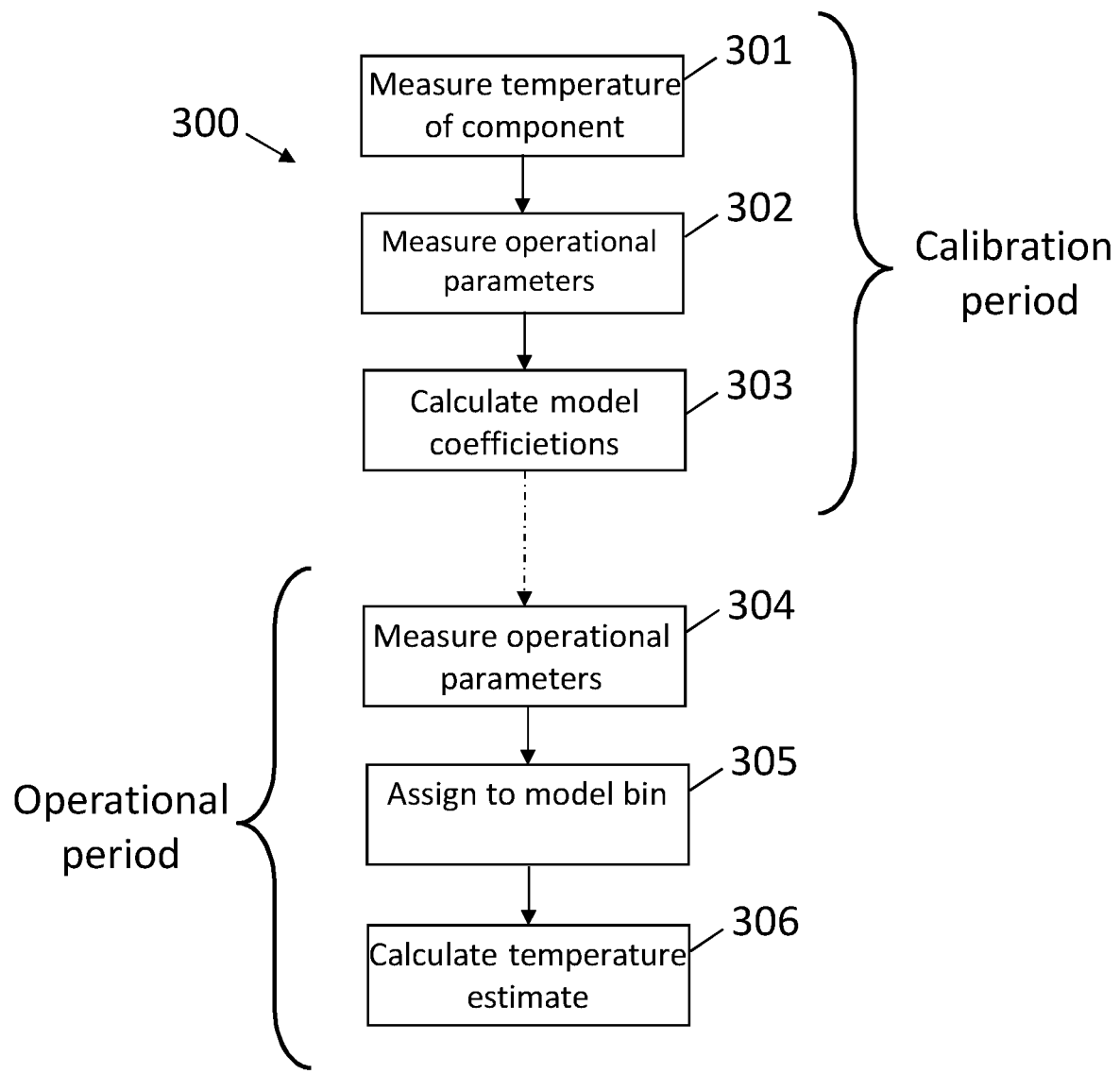
FIG. 3 illustrates a method of estimating a temperature of a component of a wind turbine.

FIG. 3 illustrates a method 300 of estimating the temperature of a component of a wind turbine 100. Using method 300, the temperature can be estimated from current operational parameters of the wind turbine, such as turbine power output, This estimated temperature can be used to in effect replace one or more of the failed temperature sensors, allowing continued safe operation of the turbine 100.

Method 300 as illustrated below comprises two distinct phases. In a first, calibration stage, parameters of a model relating component temperature to operational parameters are calculated using data measured on a specific wind turbine 100. Importantly, the model also relates current component temperature to a preceding temperature, to account for thermal inertia. In a second, operational stage, the model is used to estimate component temperature based on current operational parameters for that same turbine 100.

As used herein, temperature may refer to an absolute of a component, or to a relative temperature. For example, the temperature may be relative to a reference temperature, such as a current cooling water temperature.

Method 300 begins at step 301, in which measurements of the temperature of the component are measured by one or more temperature sensors 230.

The method then proceeds to step 302, in which measurements of one or more operational parameters of the wind turbine corresponding to the measurements of the temperature are measured. The one or more operational parameters comprise at least measurements of wind speed or power generated by the wind turbine, and may comprise further operational parameters, such as generator speed. Each of these measurements may be performed by appropriate sensors on the wind turbine, such as sensors reporting to a SCADA system, as will be appreciated by those skilled in the art.

The measurements of the operational parameters correspond to the measurements of temperature in that each measurement represents the value of the operational parameter at the time that a corresponding temperature measurement was taken. For example, corresponding measurements may be made at the same or at a similar time, such as within a predetermined time period of each other (e.g. within 1 minute, or within 5 minutes). For SCADA data, in which typically measurements are performed and averaged over 10 minute periods, the temperature and operational parameters may correspond in that they come from the same SCADA data period.

The measurements performed in steps 301 and 302 may be communicated to the turbine controller 220, which may perform the further steps detailed below. Alternatively the measurements may be communicated to an external system, which may perform the steps below on behalf of the wind turbine 100.

At step 303, coefficients of a model of the temperature of the component are calculated using the measurements of temperature and operational parameters. The model is of the form:

$$T_n \sim F(x,y,z,T_{n-1}),$$

Here, $T_n$ represents the temperature at a current time. $T_{n-1}$ represents the temperature at a preceding time—in particular the immediately previous temperature measurement/estimation. x,y,z represent values of operational parameters at the current time, such as power production. Although three operational parameters are represented, any number of parameters may be used. For example, the model may relate the current temperature only to the power/wind speed and preceding temperature. An exemplary model for the case of generator winding temperature is discussed in more detail below.

The coefficients of the model may be found using a regression technique, or any method which is able to learn from training data—i.e. from the measurements performed in steps 301 and 302. For example, machine learning or probabilistic modelling techniques may be applied to calculate the coefficients of the model.

The model is segregated into a plurality of bins based on wind speed or power generated by the wind turbine 100. The model comprises respective coefficients for each bin. For example, consider a simple model such as:

$$T_n \sim a_i(\text{PWR})^2 + b_i T_{n-1}, \qquad (1)$$

where PWR represents the output power of the turbine 100. Here, $a_i$, $b_i$ are coefficients relating, respectively, the square of the power and the preceding temperature to the current temperature.

This model is segregated into a number of bins, based on power generated. A first bin may be used for output powers in the range 100-200 kW; a second bin may be used for output powers in the range 200-300 kW, and so on. Each bin comprises respective coefficients $a_i, b_i$ for that bin. Thus for the first bin, the model is:

$$T_n \sim a_1(\text{PWR})^2 + b_1 T_{n-1}, \qquad (2)$$

where $a_1$, $b_1$ are the respective coefficients for the first bin. Similarly, for the second bin, the model is:

$$T_n \sim a_2(\text{PWR})^2 + b_2 T_{n-1}, \qquad (3)$$

where $a_2$, $b_2$ are the respective coefficients for the second bin.

When calculating the coefficients in step 303, each temperature and operational parameter is assigned to a bin based on the power/wind speed at the time that measurement was taken. Only the measurements assigned to a bin are used to calculate the coefficients for that bin, using the regression techniques described above.

Thus the model in effect comprises a number of different temperature models, each tailored to a particular power/wind speed range. This segregation of the model has been found to provide a more accurate temperature estimation than a global model for all power/wind speeds.

In some embodiments, the bins may overlap. For example, the first bin may be for output powers in the range 80-220 kW, the second bin for powers in the range 180-320 kW, the third bin for powers in the range 280-420 kW and so on. In such embodiments, each temperature and operational parameter measurement may be assigned in step 303 to multiple bins, where the wind speed/power output at the time of those measurements is covered by those multiple bins. The measurements are then used to find the coefficients of each bin they are assigned to.

The number of bins used and/or amount of overlap between bins may be selected based on the amount of data available for the generation of the model. For example, if a year or more of data is available, then a large amount of data may be available to allow many overlapping bins. For example, bins may be spaced between 5 kW and 50 kW apart, e.g. 10 kW apart (i.e. bin centres are 10 kW apart). In such cases, bin widths may be ±500 kW of the bin centre (or selected from the range ±100 kW to ±1000 kW). In such cases, the large number of data available in each bin provides robustness to the generated model. When determining the parameters of the model for each bin, a weighting factor such as a Gaussian weighting factor may be applied to the data within the bin, so that data at the centre of the bin affect the resulting parameters more than data at the edges of the bin.

It is to be noted that the model provided in equations (1)-(3) is illustrative only. Any number of operational parameters may be used in the model, selected to suit the particular component being modelled, as the skilled person would appreciate. Additionally, any model may include a constant offset coefficient, to be calculated with the coefficients of the operational parameters in step 303.

Once the coefficients of each bin of the model have been determined, the calibration period is complete, and the model is be used to estimate a temperature of the component. In particular, the method 300 may move to the operational period, starting at step 304. The method 300 may immediately proceed to step 304, or there may be a delay. For example, the method 300 may only proceed to step 304 when there is a need for temperature estimation, such as when a temperature sensor 230 fails.

At step 304, measurements of the operational parameters (i.e. the ones used in the model) are taken at a first time, $t_x$—i.e. a current time. These measurements are taken in the same manner as step 302, discussed above.

At step 305, the measurements taken in step 304 are assigned to a bin of the model based on the output power/wind speed at the first time, $t_x$. Where overlapping bins are used, as discussed above, each measurement taken in step 304 may be assigned to the bin in which the measurement is closest to the bin centre point.

At step 306, the measurements are input into the model to estimate the temperature, $T_x$, at the first time, $t_x$, using the values of the operational parameters at the first time, $t_x$, and an estimate of the temperature $T_{x-1}$ at a preceding time, $t_{x-1}$. For example, for the simple illustrative model shown in equations (1)-(3) above, if the output power at $t_x$ is in the range for the first bin, the measurements of the operational parameters at $t_x$ (in this simple case just output power) and the estimate of the temperature at a preceding time $t_{x-1}$ are input into equation (2) to estimate the temperature of the component $T_x$. The preceding time $t_{x-1}$ may in particular be the time of the last available operational parameter measurements, For example, SCADA data from a wind turbine is typically measured and averaged into 10 minute data periods. The first time may correspond to a most recent 10 minute data period, and the preceding time may correspond to the immediately preceding 10 minute data period.

The estimate of the temperature $T_{x-1}$ at the preceding time $t_{x-1}$ may have itself been generated using method 300, using measurements of operational parameters at the preceding time $t_{x-1}$ and an estimate of the temperature $T_{x-2}$ at a time $t_{x-2}$ preceding that. The temperature $T_{x-1}$ may for example have been stored in a memory, such as a memory associated with turbine controller 220, and may be retrieved from the memory to estimate the temperature $T_x$ at the first time, $t_x$ as part of step 306.

Alternatively, and in particular where no estimate from a previous run of method 300 is available, a value may be selected for the temperature $T_{x-1}$ at the preceding time $t_{x-1}$. For example, a pre-set 'starting' value such as 50° C. may be chosen, or an estimate may be made based on previous observations of typical temperatures in the wind turbine 100 or in similar wind turbines. A measurement of the temperature taken by a temperature sensor 230 may be used as the preceding temperature $T_{x-1}$, for example the last temperature measurement performed before failure of a sensor 230 may be used.

Once the temperature $T_x$ at the first, current time has been estimated, the method 300 may end. Alternatively, the steps 304-306 may be continuously run, updating the estimate of the temperature for each new measurement period based on the estimate of the temperature in the previous measurement period. In either case, the estimate of the temperature may be used to inform operation of the wind turbine 100. For example, controller 220 may alter operation of the wind turbine 100 to reduce a temperature of the component if the temperature is getting too hot.

In some embodiments, an uncertainty value may also be determined for each estimated temperature value. The uncertainty value $\sigma_x$ may be based both on the statistical uncertainty $\Sigma$ from the model for that individual temperature and on the uncertainty $\sigma_{x-1}$ of the preceding temperature estimate—i.e. the preceding temperature estimate used in the generation of the current temperature estimate. In particular, the uncertainty $\sigma_x$ of the estimation of temperature $T_x$ at the first time may be calculated as:

$$\sigma_x = \sqrt{(b_i \sigma_{x-1})^2 + \Sigma^2} \quad (4)$$

Here, $b_i$ is the coefficient relating $T_x$ to $T_{x-1}$ of the particular bin of the model used to generate $T_x$. So, for example in the simple model described above, where the first bin of the model was used calculate the temperature from equation (2), the coefficient $b_1$ would be used in the uncertainty calculation.

In this way, the thermal inertia inherent to the component is reflected in the uncertainty, providing a more valuable indication of the uncertainty of an individual temperature estimate than the statistical uncertainty alone. This improved uncertainty can then be used to inform decisions on turbine operation.

The temperature (and uncertainty) provided by method 300 may be used to validate a temperature measurement from a sensor 230, for example where other temperature sensors 230 have failed, leaving no redundancy. In this case, one or more measurements from the (remaining) sensor 230 may be received, and may be compared to corresponding estimates of the temperature generated from method 300.

If a difference between the real measurements and estimates exceeds a threshold, it may be determined that there is a fault in the sensor 230, or a physical problem in the component (e.g. overheating). The threshold may be a simple predetermined threshold based on the absolute temperature difference between the real and estimated measurements. Alternatively, the uncertainty value discussed above may be used. The threshold may be that the real temperature measurements deviate from the estimated measurements by more than a predetermined multiple of the uncertainty. For example, if the real measurement is more than 1.5 $\sigma_x$ or 2 $\sigma_x$ away from the estimated temperature, it can be determined that there is a problem.

The model generated as part of method 300 may also be used to determine a steady state temperature fora given set of fixed operational parameters. In particular, after the coefficients of each bin of the model have been determined in step 303 of method 300, the equations of the model may be solved for the case $T_n = T_{n-1}$, for fixed operational parameters to determine the steady state temperature. Calculation of the steady state temperature may be performed without estimating any operational temperatures—in other words where the model is used to determine a steady state temperature, steps 304-306 of method 300 may be omitted.

In such embodiments, a single steady state temperature may be calculated, using the coefficients of a single selected bin of the model, and selected operational parameters. Alternatively, multiple steady state temperatures may be calculated for a range of different output power/wind speeds (and hence different bins of the model), and ranges of other operational parameters included in the model, effectively resulting in a map of steady state temperatures.

The steady state temperature is calculated in this way may be used to compare performance of the turbine 100 to other turbines, or to an expected performance from the design of the turbine 100, to determine if the turbine 100 is performing correctly. For example, the steady state temperature is for an individual turbine 100 may be compared to the average behaviour of corresponding steady state temperature is from an ensemble of similar turbines (e.g. the same model, similar location, etc.). As altitude can affect temperature, the ensemble may comprise only turbines at the same or similar altitudes to the individual turbine 100, or an altitude correction factor may be determined from a regression of steady state temperature to altitude for a population of turbines, allowing turbines of different altitudes to be compared. As an alternative approach to building a fleet model, all the data measured on an ensemble of wind turbines may by combined, and used to calculate coefficients of a (binned) collective model, which would then provide average behaviour of the ensemble, and could be compared to results from an individual turbine 100 to identify anomalies in the performance of that individual turbine 100.

In any of the embodiments discussed above, the component may be at least one of a generator; a generator winding; a transformer; a transformer winding; a gearbox; gearbox oil; hydraulic oil; a converter; one or more bearings; and a cooling-water system. In general, the component may be any component of a wind turbine that exhibits thermal inertia in its temperature behaviour.

In a particular example, method 300 may be applied to estimate the temperature of a generator winding of a wind turbine 100. In such a case, the operational parameters used as part of the model may comprise output power, and at least one of generator rotor speed, generator voltage, and reactive power. For example, the model make take the form:

$$T_n \sim c_i(\text{PWR})^2 + d_i(\text{RPM}) + e_i V + f_i + g_i T_{n-1}, \quad (5)$$

where PWR is the turbine output power, RPM is the generator speed, V is the generator voltage, and $f_i$ is a constant offset coefficient. In some variants of this model, V may be omitted.

Any of the methods described above may be implemented as a computer program comprising instructions which, when the program is executed by a computer, causes the computer to perform the any of the methods described above. In particular, the computer program may be stored on a turbine controller, such as controller 220, and may cause a processor of the controller to perform any of the methods described above.

Although the invention has been described above with reference to one or more preferred embodiments, it will be appreciated that various changes or modifications may be made without departing from the scope of the invention as defined in the appended claims.

The invention claimed is:

1. A method of estimating a temperature of a component of a wind turbine, the method comprising:
   during a calibration period:
      receiving measurements of the temperature of the component measured by a temperature sensor of the wind turbine;
      receiving measurements of one or more operational parameters of the wind turbine corresponding to the measurements of the temperature, the one or more operational parameters comprising at least measurements of wind speed or power generated by the wind turbine;
      calculating, using the measurements of temperature and of the one or more operational parameters, coefficients of a model of the temperature of the component, wherein:
         the model relates a temperature of the component at a current time (T_n) to a value of the one or more operational parameters at the current time and to a temperature of the component at a preceding time (T_n−1);
         the model is segregated into separate bins based on the wind speed or the power generated by the wind turbine, such that the model comprises, for each bin, respective coefficients relating the temperature of the wind turbine at the current time (T_n) to the value of the one or more operational parameters at the current time and to the temperature of the component at the preceding time (T_n−1); and
         wherein calculating the coefficients of the model comprises assigning each measurement of the temperature and the one or more operational parameters to one or more bins of the model, and fitting the coefficients of each bin to the measurements assigned to that bin; and
   estimating the temperature of the component of the wind turbine using the model.

2. The method of claim 1, wherein using the model to estimate a temperature of the component of the wind turbine comprises:
   during an operational period:
      receiving a measurement of the one or more operational parameters taken at a first time;
      assigning the measurement of the one or more operational parameters to a bin of the model based on the wind speed or power generated at the first time; and
      inputting the measurement of the one or more operational parameters into the model to estimate the temperature of the component at the first time (T_x) using the coefficient of the bin to which the measurement is assigned and an estimate of the temperature at a time preceding the first time (T_x−1).

3. The method of claim 2, further comprising estimating an uncertainty in the temperature of the component at the first time, wherein the uncertainty is based on a statistical uncertainty of the estimate of the temperature at the first time, and on an uncertainty at the time preceding the first time.

4. The method of claim 2, further comprising, during the operational period:
   receiving a measurement of the temperature of the component measured by a temperature sensor of the wind turbine at the first time; and
   comparing the measurement to the estimate of the temperature at the first time to validate the measurement.

5. The method of claim 4, further comprising:
   determining that a difference between the measurement of temperature and the estimate of the temperature exceeds a predetermined threshold; and
   determining that the measurement from the temperature sensor is invalid.

6. The method of claim 1, wherein using the model to estimate the temperature of the component of the wind turbine comprises calculating a steady state temperature of the component from the model.

7. The method of claim 6, further comprising:
   comparing the steady state temperature of the component of the wind turbine to corresponding steady state temperatures from one or more other wind turbines.

8. The method of claim 7, further comprising identifying an anomaly in the wind turbine based on the comparison.

9. The method of claim 6, further comprising:
   comparing the steady state temperature to an expected steady state temperature of the wind turbine.

10. The method of claim 1, wherein the component is at least one of: a generator; a generator winding; a transformer; a transformer winding; a gearbox; gearbox oil; hydraulic oil; a converter; one or more bearings; and a cooling-water system.

11. The method of claim 1, where the component is a generator or generator winding, and wherein the one or more operational parameters further comprise at least one of generator rotor speed; generator voltage; and reactive power.

12. The method of claim 11, wherein the model relates a temperature of the generator or generator winding at the current time to:
   a square of a current power generated by the wind turbine;
   a current generator rotor speed; and
   a temperature of the generator or generator winding at the preceding time.

13. A non-transitory memory device comprising a computer program comprising instructions which, when the computer program is executed by one or more processors, performs an operation of estimating a temperature of a component of a wind turbine, the operation comprising:
during a calibration period:
receiving measurements of the temperature of the component measured by a temperature sensor of the wind turbine;
receiving measurements of one or more operational parameters of the wind turbine corresponding to the measurements of the temperature, the one or more operational parameters comprising at least measurements of wind speed or power generated by the wind turbine;
calculating, using the measurements of temperature and of the one or more operational parameters, coefficients of a model of the temperature of the component, wherein:
the model relates a temperature of the component at a current time ($T\_n$) to a value of the one or more operational parameters at the current time and to a temperature of the component at a preceding time ($T\_n-1$);
the model is segregated into separate bins based on the wind speed or the power generated by the wind turbine, such that the model comprises, for each bin, respective coefficients relating the temperature of the wind turbine at the current time ($T\_n$) to the value of the one or more operational parameters at the current time and to the temperature of the component at the preceding time ($T\_n-1$); and
wherein calculating the coefficients of the model comprises assigning each measurement of the temperature and the one or more operational parameters to one or more bins of the model, and fitting the coefficients of each bin to the measurements assigned to that bin; and
estimating the temperature of the component of the wind turbine using the model.

14. The non-transitory memory device of claim 13, wherein using the model to estimate the temperature of the component of the wind turbine comprises:
during an operational period:
receiving a measurement of the one or more operational parameters taken at a first time;
assigning the measurement of the one or more operational parameters to a bin of the model based on the wind speed or power generated at the first time; and
inputting the measurement of the one or more operational parameters into the model to estimate the temperature of the component at the first time ($T\_x$) using the coefficient of the bin to which the measurement is assigned and an estimate of the temperature at a time preceding the first time ($T\_x-1$).

15. A controller for a wind turbine, comprising:
a memory containing instructions; and
a processor which, when programmed by the instructions, performs an operation of estimating a temperature of a component of the wind turbine, the operation comprising:
during a calibration period:
receiving measurements of the temperature of the component measured by a temperature sensor of the wind turbine;
receiving measurements of one or more operational parameters of the wind turbine corresponding to the measurements of the temperature, the one or more operational parameters comprising at least measurements of wind speed or power generated by the wind turbine;
calculating, using the measurements of temperature and of the one or more operational parameters, coefficients of a model of the temperature of the component, wherein:
the model relates a temperature of the component at a current time ($T\_n$) to a value of the one or more operational parameters at the current time and to a temperature of the component at a preceding time ($T\_n-1$);
the model is segregated into separate bins based on the wind speed or the power generated by the wind turbine, such that the model comprises, for each bin, respective coefficients relating the temperature of the wind turbine at the current time ($T\_n$) to the value of the one or more operational parameters at the current time and to the temperature of the component at the preceding time ($T\_n-1$); and
wherein calculating the coefficients of the model comprises assigning each measurement of the temperature and the one or more operational parameters to one or more bins of the model, and fitting the coefficients of each bin to the measurements assigned to that bin; and
estimating the temperature of the component of the wind turbine using the model.

16. The controller of claim 15, wherein using the model to estimate the temperature of the component of the wind turbine comprises:
during an operational period:
receiving a measurement of the one or more operational parameters taken at a first time;
assigning the measurement of the one or more operational parameters to a bin of the model based on the wind speed or power generated at the first time; and
inputting the measurement of the one or more operational parameters into the model to estimate the temperature of the component at the first time ($T\_x$) using the coefficient of the bin to which the measurement is assigned and an estimate of the temperature at a time preceding the first time ($T\_x-1$).

17. A wind turbine comprising:
a tower;
a nacelle disposed on the tower;
a rotor extending from the nacelle;
a plurality of blades disposed on a distal end of the rotor;
one or more sensors for measuring operational parameters during operation of the wind turbine; and
a controller configured to receive the operational parameters and perform an operation of estimating a temperature of a component of the wind turbine, the operation, comprising:
during a calibration period:
receiving measurements of the temperature of the component measured by a temperature sensor of the wind turbine;
receiving measurements of one or more of the operational parameters of the wind turbine corresponding to the measurements of the temperature, the one or more operational parameters comprising at least measurements of wind speed or power generated by the wind turbine;
calculating, using the measurements of temperature and of the one or more operational parameters, coefficients of a model of the temperature of the component, wherein:

the model relates a temperature of the component at a current time (T_n) to a value of the one or more operational parameters at the current time and to a temperature of the component at a preceding time (T_n−1);

the model is segregated into separate bins based on the wind speed or the power generated by the wind turbine, such that the model comprises, for each bin, respective coefficients relating the temperature of the wind turbine at the current time (T_n) to the value of the one or more operational parameters at the current time and to the temperature of the component at a preceding time (T_n−1); and wherein calculating the coefficients of the model comprises assigning each measurement of the temperature and the one or more operational parameters to one or more bins of the model, and fitting the coefficients of each bin to the measurements assigned to that bin; and estimating the temperature of the component of the wind turbine using the model.

\* \* \* \* \*